March 25, 1952  C. BIRDSEYE  2,590,747
METHOD AND APPARATUS FOR REMOVING
SKIN FROM FLESHY PRODUCTS
Filed March 4, 1949  3 Sheets-Sheet 1
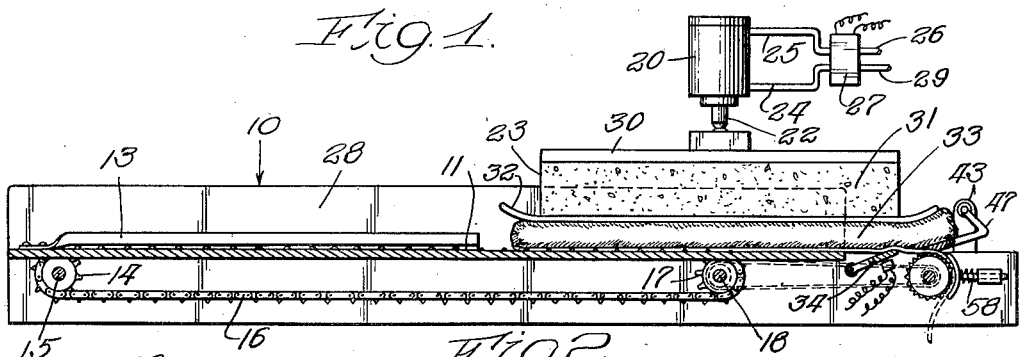
Inventor,
Clarence Birdseye,
By Schroeder, Merriam,
Hofgren & Brady, Attys.

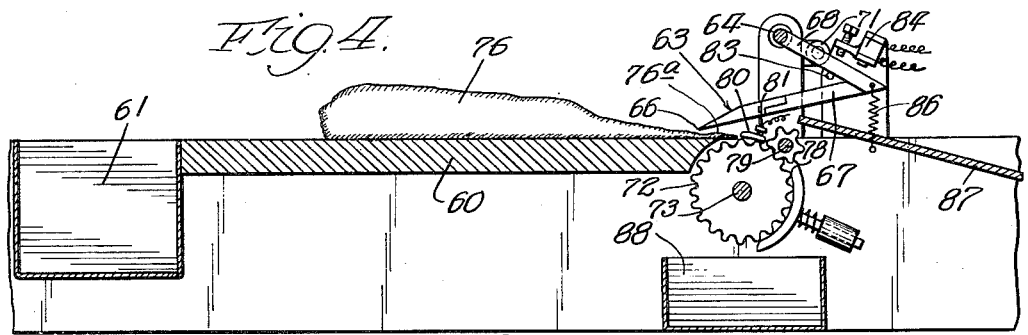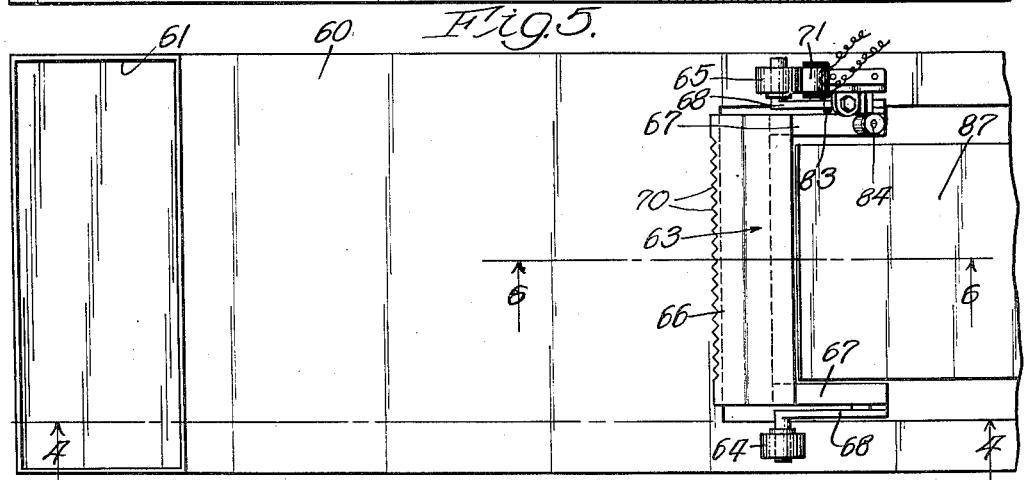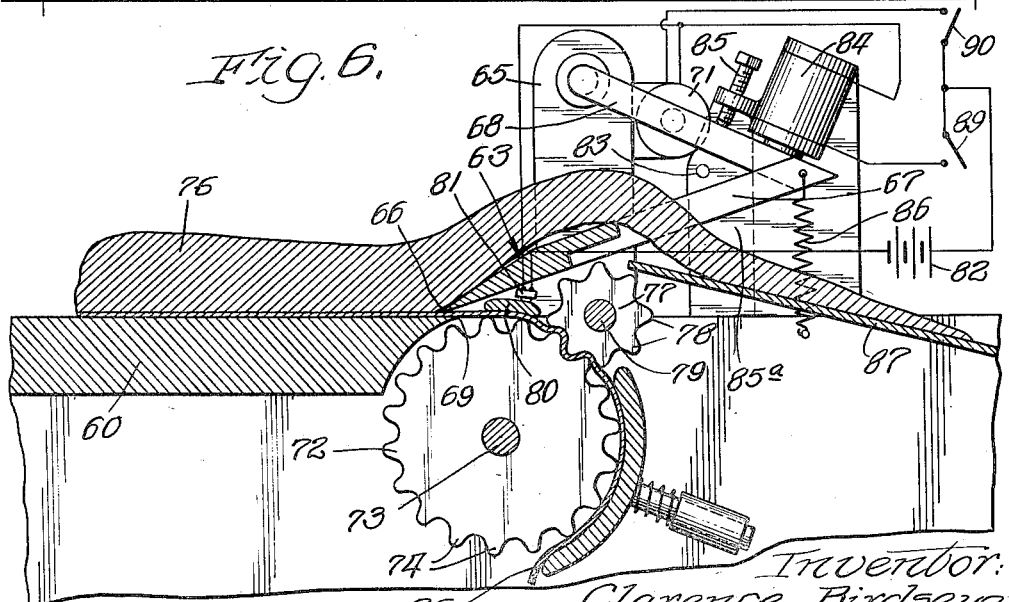

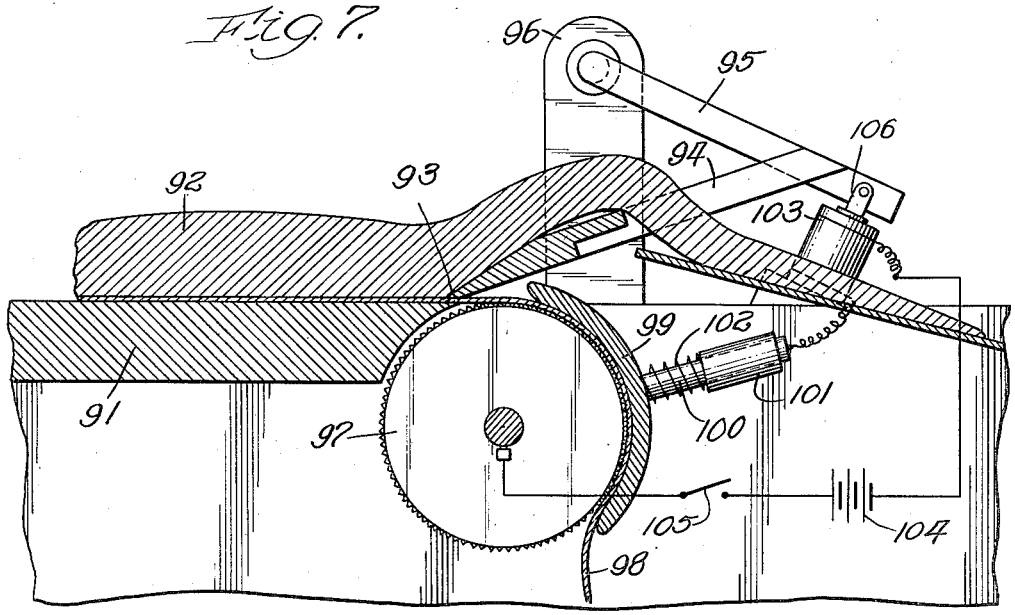
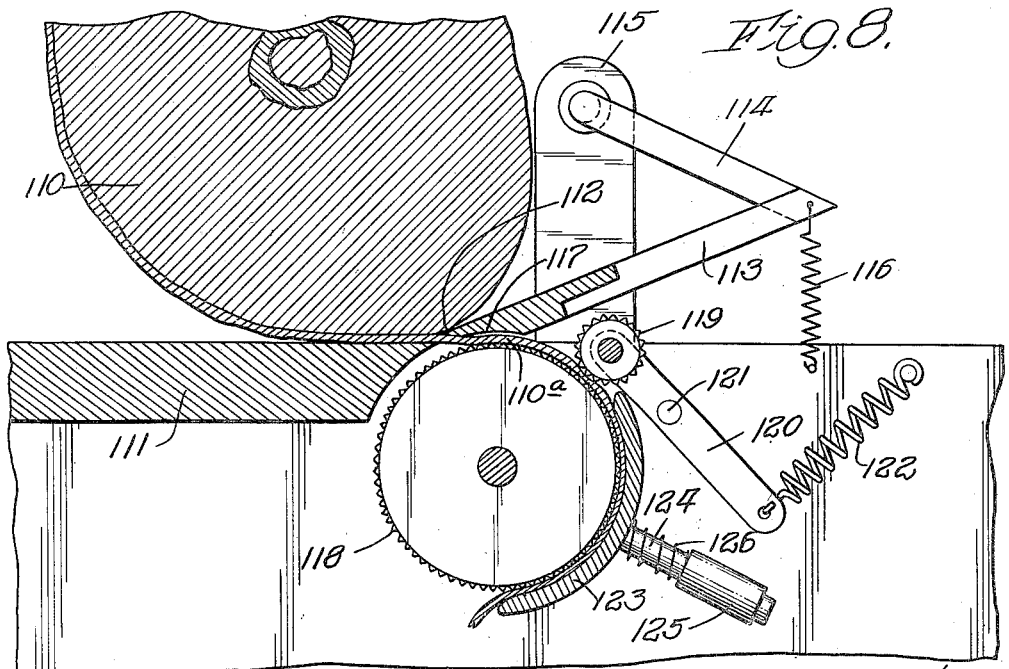

Patented Mar. 25, 1952

2,590,747

UNITED STATES PATENT OFFICE 2,590,747

METHOD AND APPARATUS FOR REMOVING SKIN FROM FLESHY PRODUCTS

Clarence Birdseye, Gloucester, Mass., assignor to Eleanor G. Birdseye, Gloucester, Mass.

Application March 4, 1949, Serial No. 79,708

3 Claims. (Cl. 146—130)

This invention relates to a skinning apparatus and more particularly to methods and apparatus for removing the skins from fleshy products, such as fish fillets and pork.

It is the principal object of this invention to produce a skinning apparatus which is simple in construction and which is adaptable to semi or fully automatic operation for removing the skins of both fish and meat products.

Fish skins and meat skins vary greatly in size, thickness and in their degree of adherence to the flesh and it has been generally necessary in the past to provide a different skinning apparatus for each particular type of skinning operation. I have found that by mounting a skinning knife in a position where it enters the flesh above the skin and is driven downwardly to the skin by the motion of the product against the knife I can provide an apparatus by which substantially all types of fleshy products may be skinned. Accordingly, it is a further object of this invention to provide a movably mounted knife which is movable to an inclined position and driven through the flesh toward the skin by the motion of the product undergoing skinning.

In some species of fish, such as the haddock, the skin is scaly, relatively thin and weak, and very lightly attached to the flesh. I have found that the skin of such fish may be removed by a pivotally mounted knife functioning in cooperation with a firm but gentle skin gripping device applied very close to the back of the knife. It is, therefore, a further object of this invention to produce a skinning apparatus having resiliently mounted means for gripping the skin of a product before and during its severance from the flesh.

Other kinds of fish, such as the hake, possess extremely thin and delicate skin and I have found that in such instances skinning operations can be successfully performed if the knife edge is oscillated constantly and in a path at substantially right angles to the path of movement of the fillet thereagainst. Skin from other fish, such as the salt water catfish, which have very tough skins tightly attached to the flesh, may also be removed by means of an oscillating knife. I have found that the vibrations should be sufficiently rapid and short so that the inertia of the flesh is sufficient to keep the flesh stationary during oscillations of the knife. Thus, for hake for example, a knife stroke of $\frac{3}{16}$ inch vibrated at 5000 cycles per second will sever the flesh from the skin without visibly vibrating the flesh. It is, therefore, a further object of this invention to produce a skinning apparatus having a rapidly oscillating knife, the oscillation being in the order of 2500 to 5000 cycles per minute.

Fish fillets vary greatly in length, width, thickness and in consistency of the flesh. It is, therefore, another object of the invention to produce a skinning device which is automatically adaptable to a wide variety of operating conditions.

Pork skins are generally tough, possess great tensile strength, vary in thickness with age and sex, and are made quite slippery by their high fat content. When pork skins are chilled or cured they become wrinkled and relatively stiff. It is a further object of the invention to provide skinning apparatus having means for smoothing the skin of the product before it is severed therefrom.

Fat backs and bacon slabs are generally flat, oblong, rectangular and of variable thickness both from side to side and end to end. The slabs are considerably wrinkled on the skin side. It is a further object of the invention to provide a skinning device provided with means for flattening slabs before they are brought against the skinning knife and for continuing the flattening operation until the entire slab has been skinned.

Slabs also vary from about $\frac{3}{4}$" to 4" in thickness and their front edges, in passing through a skinning machine, are roughly perpendicular to their bottom or skin covered surface. Such blunt, thick surfaces make the problem of initially gripping the skin difficult. I have solved this problem by providing means for pushing the slab against the knife for the initial cut and further by providing means on the knife for pressing the severed skin against skin gripping means.

These and other features and objects of the invention and the methods used therewith will be apparent from the following disclosure and drawings in which:

Fig. 1 is a side elevation of one embodiment of the skinning apparatus;

Fig. 2 is a top plan view, partially broken away, of the apparatus of Fig. 1;

Fig. 3 is a vertical section along line 3—3 of Fig. 2;

Fig. 4 is a view like Fig. 1 of a different form of the apparatus and showing the location of parts immediately prior to the start of skinning;

Fig. 5 is a top plan view of the apparatus of Fig. 4;

Fig. 6 is a vertical section through a portion of the apparatus of Fig. 5 taken along line 6—6 thereof and showing the position of the parts during the skinning operation;

Figs. 7 and 8 are views like Fig. 6 of modified forms of construction.

While I have shown and described certain embodiments of my invention, it is to be understood that it is capable of many modifications. Changes, therefore, in the construction and arrangement may be made without departing from the spirit and scope of the invention as disclosed in the appended claims.

Referring now to Figs. 1 to 3 of the drawings, I show a slab skinning apparatus 10 comprising a flat table 11 provided with parallel slots 12 therein. A straightening bar 13 is mounted at the left hand end (as seen in those figures) of the bed and consists of a resilient steel arm adapted to turn slabs on the device as they are conveyed from left to right to align them for the subsequent skinning operation. A plurality of sprockets 14 are mounted beneath the table on a shaft 15 which is driven from a source of power such as motor (not shown). A plurality of spiked conveyor belts 16 runs from the sprockets 14 to a second plurality of sprockets 17 rotatably mounted on shaft 18. The spikes of the conveyor extend upwardly through the slots 12 to engage the underside of the slab to be skinned.

Mounted above the table and adjacent to the right hand end thereof is a pneumatic piston and cylinder device 20. A piston 21 is reciprocally mounted in the device and carries a rod 22 upon whose lower end a presser device 23 is mounted. Reciprocation of the piston 21 within the device 20 is accomplished by compressed air led thereto by pneumatic lines 24 and 25 opening into opposite ends of the cylinder. Compressed air is supplied to the lines 24 and 25 from a pipe 26 connected to a source of compressed air. A solenoid valve 27 is employed in the circuit to direct compressed air to either of the lines 24 or 25 and to connect the other of those lines with the exhaust line 29. The solenoid valve is preferably spring urged to a position directing compressed air into the line 24 to raise the piston, opening the line 25 to the exhaust 29. Energization of the solenoid causes it to move against the spring to direct compressed air into the line 25 to move the piston downward.

A guide rail 28 projects above the table 11 along one edge thereof to cooperate with the straightening bar 13 to align the slabs as they pass along the table. The presser device 23 consists of a steel plate 30 upon whose lower side a plurality of resilient rubber blocks 31 are mounted, each of the blocks carrying a metallic shoe 32 adapted to press against the upper surface of a slab 33 as it is moved along the table.

Located in the path of the moving slab and under the presser device is a skin smoothing bar 34 pivotally mounted on the bed. The device 34 is normally urged to a position as shown in the dotted lines by a spring 35 and is adapted to be pivoted to the position shown in solid lines by the weight of the slab. As the smoothing bar 34 is moved to the position shown in Fig. 3 it contacts a switch 36 for actuating the solenoid 27 to direct air under pressure through line 25 to move the piston and hence the presser device downward against a slab of bacon travelling from left to right on the bed 11. It will be noted that in its fully depressed position the smoothing bar still extends above the top surface of the table 11 and serves to bend an area of the skin 38 to smooth out any wrinkles in the skin. The switch 36 is, of course, connected to a battery 40 in an electrical circuit to provide for the energization of the solenoid 27. Also provided in the electrical circuit is a switch 41 which may be used to interrupt the connection to the solenoid in the event it is desired to perform skinning operations without the benefit of the overhead presser shoes.

A pair of upstanding brackets 42 and 43 are mounted on the bed adjacent the right hand end thereof. Pivotally mounted between the brackets is a skinning knife 44 provided with a cutting edge 45 attached to an arm 46 which in turn is integrally connected to a second arm 47 extending upwardly to the brackets 42 and 43. The knife 44 is free to pivot in the brackets and when not in contact with a slab is swung upwardly by spring 48 to a position bringing the edge 45 a short distance above a knurled skin grip roll 50 mounted thereunder. As the slab is moved along the bed by the spiked conveyor and driven against the edge 45 the knife is free to pivot to the position shown wherein the knife edge is driven downwardly toward the skin.

Some considerable force is necessary to effect penetration of the knife edge, but ample force may be supplied through the spiked conveyor, and the presser device serves not only to flatten the slab in the event it has become curled during the previous curing processes but, in cooperation with the guide rail 28, acts to hold the slab against movement in any direction except along the bed and against the knife.

As skin is removed from the bottom of the slab it is engaged by the skin grip roll 50 which extends substantially the entire width of the table. The roll 50 is driven by means of a chain 51 and sprocket 52 connected with a sprocket 53 mounted on the shaft 18. The skin grip roll is driven at a slightly faster rate than the speed of the spiked conveyor by virtue of the difference in size of the sprockets 52 and 53. A shoe 55 is mounted adjacent the side of the roll 50 and is resiliently urged thereagainst by springs 56 having one end resting against the shoe and the other end against collars 57 fixed to the side of the table and in each of which a rod 58 carrying the shoe is slidably mounted. The shoe serves to hold the skin separated from the slab in close engagement with the teeth provided on the roll 50 to exert a strong pulling action on the slab to assist the conveyor in moving the slab across the table and further to complete the movement of the slab after it has passed beyond the spiked conveyor.

Referring now to Figs. 4 to 6 inclusive, I show a machine which is particularly adapted for skinning of fish fillets. In the embodiment shown in these figures there is provided a bed 60 having a basket 61 at its left hand end from which fillets to be skinned may be removed.

A cutting knife 63 is mounted upon upstanding brackets 64 and 65 located adjacent the right hand end of the table. The knife, as in the previous embodiment, is provided with an edge 66 mounted upon arms 67 which in turn are integrally connected to second arms 68 pivotally mounted in the brackets.

The knife edge 66 is provided with a plurality of serrations 70. These serrations have a wave length of less than $\frac{1}{16}$th of an inch and I provide an electric vibrator 71 adapted to operate against an arm 68 to vibrate the knife horizontally. The vibrator produces a horizontal stroke of from 1 to 5 times the wave length of the serrations 70 and the vibrations produced may be varied between 2500 and 5000 cycles per minute. I find that by vibrating the knife at such high speed and with such short stroke that the inertia of the flesh is sufficient to prevent the flesh from vibrating with the knife.

Rotatably mounted adjacent the end of the bed is a skin grip roll 72 mounted upon a shaft 73 driven by some positive means such as a motor. The skin grip roll is provided with a plurality of teeth 74 adapted to engage the skin 75 stripped from a fillet 76. A second roll 77 is provided with teeth 78 meshing with the teeth 74 and mounted upon a shaft 79 resiliently mounted on the bed. The purpose of the roll 77 is to insure good gripping contact between the skin 75 and the roll 72. A contact lift bar 80 is provided immediately ahead of the roll 77 and is adapted to be moved upwardly into contact with switch 81 when the tails of the fillet pass thereunder. Contact of the lift bar 80 with the switch 81 completes an electrical circuit through a battery 82 to the vibrator 71 for vibrating the blade. A spring 86 is attached to the bed 60 and to an arm 68 to hold the knife edge above the table to permit the undesired tail portion 76a of the fillet to pass beneath the knife to actuate switch 81 and to be engaged by the roll 72. The upward movement of the knife is limited by a stop 83.

In some fillets, such as hake, where the flesh is very tender, I may provide means for holding the knife blade down against the skin once it has entered the fillet. Accordingly, I may employ an electro-magnet 84 similarly energized from the battery 82 through actuation of the switch 81 and acting against the upper arm 68 of the knife to hold the arm in the downward position shown.

An adjustable stop 85 is secured to a bracket 85a upon which the magnet 84 is mounted and is adapted to contact the arm 68 to permit accurate adjustment of the depth of cut by varying the distance of the knife edge above the table during skinning operation. The stop 85 may, of course, be used for the same purpose regardless of whether or not the magnet 84 is being used.

The fleshy portion of fillets, after skinning, is passed from the knife to a conveyor platform 87 while the skins drop down into a container 88. Switches 89 and 90 are employed in the circuit to cut the vibrator or the electro-magnet in or out of the circuit as desired, depending upon the particular characteristics of the material undergoing skinning.

Referring now to Fig. 7, I show a somewhat modified form of the invention comprising a bed 91 upon which a fillet 92 to be skinned is moved from left to right and against a knife edge 93 mounted as the previous embodiments upon lower arm 94 and upper arm 95 pivotally mounted in a pair of brackets 96. A skin grip roll 97 is provided with a knurled outer surface against which the severed skin 98 is urged by a shoe 99 mounted upon a rod 100 slidable in a collar 101 connected to the bed. A spring 102 between the collar and the shoe serves as the urging means to insure gripping engagement between the surface of the skin grip roll 97 and the skin. It may be advantageous in some skinning operations to oscillate the knife not horizontally but pivotally about its pivotal axis in the brackets 96. For this purpose, I provide an electrical vibrator 103 having an armature connected by means of rod 106 to the arm 95 and connected in a circuit with a battery 104. The circuit includes the shoe 99 and the skin grip roll 97 and the circuit is completed through the skin 98 to actuate the vibrator. A switch 105 is inserted in the circuit to cut off the vibrating means in the event that they are not desired.

In Fig. 8 I show a device particularly adapted for the skinning of large irregular objects, such as a ham 110. The device includes a bed 111, a knife edge 112 mounted upon arms 113 and 114 pivotally mounted upon brackets 115 generally as previously described. A spring 116 holds the knife edge above the bed prior to contact with the product. The knife is provided with a concave undersurface 117 located to the right (as seen in Fig. 8) of the cutting edge 112. In cutting large irregular objects, such as a ham 110, it is necessary that the skin be forced down into good gripping contact with a skin grip means, such as the roll 118, to insure that the knife will continue to be driven through the product. By so pivotally mounting the knife and with the provision of the concave undersurface 117, I provide a device that will with movement of the ham drive the skin 110a downwardly into firm gripping engagement with the roll 118. When enough of the skin has been severed it will ride under the second grip roll 119 rotatably mounted upon arm 120. The arm 120 is pivoted at 121 to the side of the apparatus and the roll 119 is urged against the roll 118 by means of the spring 122. A shoe 123 is mounted upon a rod 124 slidable in a collar 125 mounted on the side of the bed and urged against the roll 118 by means of the spring 126 to press the severed skin against the roll 118 as the skinning continues.

While in the exemplary embodiments of the invention shown in the drawings the various electrical devices, such as vibrators and magnets, are operated from a battery, it is clear that such devices may be operated by other sources of electrical power, or that mechanical means functioning in a similar manner may be substituted for the electrical devices.

I claim:

1. Apparatus for severing the skin from a fleshy product comprising a bed, a presser shoe above the bed, means for pressing the shoe against the product on the bed, a knife above the bed for severing the skin from the product, a conveyor located on one side of the knife for moving the product along the bed and against the knife, a switch on the bed operated by the product for actuating the pressing means, a skin grip roll rotatably mounted on the other side of the knife, and a resiliently mounted shoe for pressing the severed skin into engagement with the skin grip roll.

2. Apparatus for severing the skin from a fleshy product comprising a substantially horizontal bed, a plurality of resiliently mounted presser shoes above the bed, means for pressing the shoes against the upper surface of product on the bed, a knife above the bed and mounted for pivotal movement to a downwardly inclined position, a conveyor on the bed for initially moving the product against the knife to pivot the knife and to drive the knife downwardly into the product toward the skin, a skin-smoothing bar upstanding from the bed under the presser shoes and adapted to bend the skin of the product as it moves thereover, and a skin grip roll positioned to grasp the severed skin to continue the movement of the product against the knife.

3. Apparatus for severing the skin from a fleshy product comprising a substantially horizontal bed, a plurality of resiliently mounted presser shoes above the bed, means for pressing the shoes against the upper surface of product on the bed, a knife above the bed and mounted for pivotal movement to a downwardly inclined position, a spiked conveyor on the bed for moving the product against the knife to pivot the knife and to drive the knife downwardly into the product toward the skin, a skin-smoothing bar upstanding from the bed under the presser shoes and adapted to bend the skin of the product as it moves thereover, a skin grip roll positioned to grip the severed skin to continue the movement of the product against the knife and means for driving the skin grip roll at a greater peripheral speed than the speed of the conveyor.

CLARENCE BIRDSEYE.

REFERENCES CITED

The following references are of record in the file of this patent:

UNITED STATES PATENTS

| Number | Name | Date |
| --- | --- | --- |
| Re. 23,222 | Townsend | Apr. 25, 1950 |
| 922,214 | Turner | May 18, 1909 |
| 1,225,900 | Webster | May 15, 1917 |
| 1,350,096 | Fisher | Aug. 17, 1920 |
| 1,416,723 | Kraft | May 23, 1922 |
| 1,714,886 | O'Connor | May 28, 1929 |
| 1,975,044 | Kelly | Sept. 25, 1934 |
| 2,254,969 | Lindsey | Sept. 2, 1941 |
| 2,477,289 | De Moss | July 26, 1949 |
| 2,539,692 | Hickman et al | Jan. 30, 1951 |